United States Patent [19]
Killian

[11] Patent Number: 5,479,630
[45] Date of Patent: Dec. 26, 1995

[54] HYBRID CACHE HAVING PHYSICAL-CACHE AND VIRTUAL-CACHE CHARACTERISTICS AND METHOD FOR ACCESSING SAME

[75] Inventor: Earl A. Killian, Los Altos, Calif.

[73] Assignee: Silicon Graphics Inc., Mountain View, Calif.

[21] Appl. No.: 212,377

[22] Filed: Mar. 11, 1994

Related U.S. Application Data

[63] Continuation of Ser. No. 679,709, Apr. 3, 1991, abandoned.

[51] Int. Cl.$^6$ ..................................................... G06F 12/00
[52] U.S. Cl. ............................................. 395/403; 395/446
[58] Field of Search ..................................... 395/400, 425; 364/200 MS File, 900 MS File, DIG. 1, DIG. 2

[56] References Cited

U.S. PATENT DOCUMENTS

| | | | |
|---|---|---|---|
| 4,825,412 | 4/1989 | Sager et al. | 395/400 |
| 4,991,089 | 2/1991 | Bosshart | 395/425 |
| 5,003,459 | 3/1991 | Ramanajan et al. | 395/400 |
| 5,077,826 | 12/1991 | Grohoski et al. | 395/400 |
| 5,113,514 | 5/1992 | Albonesi et al. | 395/425 |
| 5,165,028 | 11/1992 | Zulian | 395/400 |
| 5,226,133 | 7/1993 | Taylor et al. | 395/400 |
| 5,307,477 | 4/1994 | Taylor et al. | 395/425 |

FOREIGN PATENT DOCUMENTS 0206050  12/1986  European Pat. Off. .

OTHER PUBLICATIONS

Hayes, John P., *Computer Architecture and Organization*, 2d Ed., 1988 pp. 442–458.

*Primary Examiner*—Jack A. Lane
*Attorney, Agent, or Firm*—Silicon Graphics Inc.

[57] ABSTRACT

A cache memory system includes a primary cache characterized by a virtual index and physical tags, and a secondary cache characterized by a physical index and physical tag. Thus, the cache system forms a hybrid of physical-cache and virtual-cache characteristics. Further, the secondary cache includes a primary index segment for each line of secondary cache. The primary index segment corresponds to a portion of the virtual address for the contents stored at the respective secondary-cache line. Further, primary cache is maintained as a subset of secondary cache. To maintain the primary cache in such a way, the primary index segment is used to generate an index into primary cache to identify each potential primary-cache block which may be a subset of a secondary-cache block to be changed. When a secondary-cache block is to be invalidated, flushed or overwritten, the corresponding primary-cache blocks are identified and invalidated. The primary index segment also serves as a virtual tag for assuring that at any given time primary cache stores no more than one valid block corresponding to the same physical locations. When a secondary-cache hit occurs in response to a secondary-cache physical tag check, the primary index segment is compared to a portion of the virtual address. If the segment does not match, then primary cache may already have a word stored which corresponds to the desired physical location. As a result, the corresponding block in primary cache is invalidated and the primary index segment in secondary cache is changed to the current virtual address segment.

13 Claims, 5 Drawing Sheets

HYBRID CACHE HAVING PHYSICAL-CACHE AND VIRTUAL-CACHE CHARACTERISTICS AND METHOD FOR ACCESSING SAME

This is a Continuation of application Ser. No. 07/679,709, filed Apr. 3, 1991, now abandoned.

BACKGROUND OF THE INVENTION

This invention relates to cache memory and methods for accessing cache memory. More particularly, this invention relates to a hybrid cache system in which primary cache is accessed with a virtual index, secondary cache is accessed with a physical index and primary cache is maintained as a subset of secondary cache.

Memory access time is a factor which frequently limits host processor throughput. Accordingly cache memory often is implemented. Cache memory is an independent bank of high-speed memory enabling quick access to stored contents so as to improve computer performance. Such cache memory serves as a buffer between lower-speed main memory and the host processor.

Typically, a hierarchical structure of cache memories is implemented, including for example, primary cache and secondary cache. Primary cache typically is small having a fast access time. Secondary cache typically is larger and slower than primary cache, but smaller and faster than main memory. Primary cache may include a primary instruction cache and a primary data cache. Primary instruction cache stores instructions from main memory, while primary data cache stores data from main memory. Secondary cache serves as a backup in the event of a cache miss (e.g., instruction/data not present) in primary cache.

The use of separate primary caches for instructions and data enables the processor to access the primary instruction cache and primary data cache in parallel, thereby further improving host processor throughput. In addition, because the locality of a set of instructions or a set of data is much higher than that of a mixture of instructions and data, separate caches may result in less cache misses than a single shared cache.

FIG. 1 shows a conventional cache memory format. A cache 10 is formed by several lines 12. Each line 12 includes a tag 14 and a block 16 of words 18. A cache having 1024 lines with four eight-bit words per line forms a four kilo-byte ("4 KB") cache memory. For an instruction cache, each word corresponds to an instruction, while for a data cache, each word corresponds to a data item. As described, there is a tag 14 for each line 12. Thus, there is one tag 14 for each four word block 16 in the example recited above. To access a word 18 in cache 10, an index is used to select the line and word.

The source of such tag and index are used to characterize cache as either physical cache or virtual cache. For a physical cache, the tag and index are derived from the physical address of the contents sought. For a virtual cache, the tag and index are derived from the virtual address of the contents sought. Computer systems today are known to use physical addresses or virtual addresses. Computer systems using virtual addresses are often referred to as virtual machines and include a mapping function for mapping virtual addresses to the corresponding physical addresses. Virtual machines are known to use either physical cache or virtual cache.

FIG. 2 shows a block diagram which depicts the method of accessing a physical cache by a virtual machine. As shown, the virtual address is input to a translation look-aside buffer (TLB) 20 where it is translated into a physical address. The physical address then is parsed to form an index into the cache 22 to address the appropriate cache location. The tag for such location then is compared with another parse of the translated physical address. Accordingly, the translation and tag check are performed in series. If the tag and parse match, then there is a cache hit (e.g., cache contents are for the desired physical address). If the tag and parse do not match, then there is a cache miss (e.g., the desired physical address contents are not currently present or available in the cache). Because a physical cache on a virtual machine requires translation of the virtual address before accessing cache there is an undesirable delay added to the memory access procedure. Accordingly, there is a need for a cache for a virtual machine which enables optimal memory access times.

It also is known to perform an address translation in parallel with a cache access where the number of cache index bits are fewer than the number of page offset bits in main memory. The smaller sizing of the index, however, results in size restrictions. Accordingly, there is a need for a cache memory system having address translation and cache access performed in parallel in which the number of cache index bits may exceed the number of page offset bits.

With regard to a virtual cache, several problems arise which must be overcome to maintain a coherent cache system (e.g., the stored information is valid if indicated as valid). An example of a problem to be resolved is the resulting invalidation of virtual tags whenever the virtual address to physical address map changes. For a multi-process computer system, this may occur frequently. Typically, the cache is flushed in response to such a map change.

As another example, when a virtual index is used, several cache locations may correspond to the same physical address. Because virtual processes may include multiple virtual addresses which translate to the same physical location, more than one virtual index may result for the different virtual addresses. Thus, the cache may include multiple entries for the same physical location. Accordingly, management of multiple cache entries mapped to the same physical location may be necessary to maintain cache coherency.

Additional problems for implementing a virtual cache result from the common practice of using physical addresses on local buses. To access cache from such a bus (as opposed to from the host processor) requires a physical address. For accesses which are unrelated to an access by the host processor, the bus has no information for relating the physical address to a virtual address. A reverse map of physical addresses to virtual addresses could be implemented, although such an approach would be expensive. Accordingly, there is a need for a cache format and method of access which enables the physical address on the bus to be used for accessing cache memory.

The problem with accessing cache memory over the bus is particularly significant in multi-processor systems. For such systems, a snooper device often is used to monitor the bus transactions and aid in maintaining cache coherency. Conventionally, bus transactions are monitored for such systems so as to invalidate or update cache locations, when necessary. Thus, writing to a location in one cache may require invalidating or updating a corresponding location in another cache. Failure to maintain cache coherency results in a processor accessing old data already overwritten in main memory, but not yet updated in the local cache.

Accordingly, there is a need for a cache memory and method for accessing same, in which cache coherency is maintained and optimal access times are achieved.

SUMMARY OF THE INVENTION

According to the invention, a hybrid cache memory system is provided including primary cache and secondary cache. The term "hybrid" is used to designate that primary cache and secondary cache are not of the same physical-cache/virtual-cache characteristics. Primary cache has the physical cache characteristic of a physical tag and the virtual cache characteristic of a virtual index. Secondary cache has the physical-cache characteristics of a physical tag and a physical index. Secondary cache, in addition, has a previously unknown feature—a primary index segment. Such primary index segment is used to derive an index to primary cache when tracing back from secondary cache.

The virtual index provides an advantage to the primary cache by enabling direct access to the primary cache without first performing a virtual address to physical address translation. Accordingly, an optimal access time may be achieved. The physical index provides an advantage to the secondary cache by enabling direct access to the secondary cache from a local bus without regard to the virtual address. Accordingly, "snooping" of bus transactions may occur. The primary index segment provides an advantage to the secondary cache by enabling primary-cache blocks which may correspond to a portion of a secondary-cache block to be traced back from secondary cache.

According to one aspect of the invention, access to primary cache using a virtual index is performed in parallel with a virtual address to physical address translation. Upon completion of the cache access and the virtual address to physical address translation, the physical address tag stored in the primary cache is checked against corresponding bits in the translated physical address. If the bits match, then there is a cache hit and the stored contents are available for use. If the bits do not match, then there is a cache miss and secondary cache is accessed to look for the desired contents. As the virtual address to physical address translation has already occurred, the physical address is available to derive a physical index for secondary cache.

According to another aspect of the invention, the cache index need not have lesser bits than the page offset in memory.

According to another aspect of the invention, the format for a line of secondary cache includes a physical tag, a block of words and a primary index segment. As the primary cache and secondary cache start out empty, initial cache accesses result in a cache miss to both primary cache and secondary cache. Thus, main memory is accessed using the translated physical address. Accordingly, secondary cache is loaded with a block of words including the word corresponding to the translated physical address. Secondary cache also is loaded with the physical tag corresponding to such translated physical address. Because the request originated from the processor, the virtual address also is available. Thus, a portion of the virtual address common to each item in the block is stored at the accessed line of secondary cache as a primary index segment.

According to another aspect of the invention, primary cache only stores one item corresponding to a given physical location at a given time. It is common for a process or processes to have different virtual addresses which map to the same physical address. Thus, a primary cache using a virtual index may potentially include two blocks corresponding to the same physical addresses. Such potential is precluded according to an aspect of this invention.

For a process or processes having a first virtual address and second virtual address mapped to the same physical location, consider that the host processor first comes across the first virtual address so that a corresponding block is loaded into primary cache and secondary cache. Secondary cache, therefore stores a primary index segment corresponding to the first virtual address. Thereafter, when the host processor comes across the second virtual address causing an access to primary cache to be performed, a cache miss results. Thus, secondary cache is accessed. Because the first and second virtual addresses map to the same physical location and because secondary cache is accessed with a physical index, the index points to the same location as for the first virtual address. When the tag check is performed, the physical tag matches the appropriate portion of the translated physical address. The primary index segment, however, is checked also, enabling a distinction between the first and second virtual addresses in the secondary cache.

If the primary index segment matches the corresponding portion of the virtual address, then the secondary-cache block includes the primary-cache block for the desired virtual address. Accordingly, primary cache is loaded with a block of words, such block being a subset of the source secondary-cache block. If the primary index segment does not match, then the primary cache data at the first offset is flushed back to secondary cache and the stored primary index segment is replaced with the reference segment derived from the accessing virtual address (e.g., the second virtual address). Thereafter, primary cache is loaded with a subset of the source secondary-cache block. Accordingly, primary cache does not simultaneously store more than one valid item which is mapped to the same physical address. Cache coherency within primary cache, therefore, is maintained.

According to another aspect of the invention, primary-cache blocks which may correspond to a block of a secondary-cache block are inspected when such secondary cache block status or contents are to be changed. For each primary-cache block which is a subset of such secondary-cache block, such primary-cache block is invalidated. Accordingly, whenever a block is to be loaded into secondary cache, the primary index segment of the prior contents is used to identify any corresponding blocks in primary cache. Such corresponding primary-cache blocks are invalidated.

For an example in which primary cache uses a 4-word block and secondary cache uses a 16-word block, up to four primary-cache blocks may be derived from one secondary-cache block. Thus, at the time a secondary-cache block is loaded, up to four corresponding primary-cache blocks may be present in primary cache. Accordingly, such one to four primary-cache blocks must be invalidated. To identify the primary blocks to be invalidated, a primary-cache index is formed which points to such blocks.

According to another aspect of the invention, a primary-cache index is derivable from the primary index segment stored in secondary cache. Thus, any blocks in primary cache which are a subset of such secondary-cache block may be accessed. The primary-cache index corresponds to a subset of the bits which form the virtual address for the word stored at the accessed primary-cache line. A virtual address typically includes high-order bits corresponding to a virtual-memory page number and low-order bits corresponding to an offset within such virtual page. The primary index corresponds to a lower-order segment of the virtual-memory page number, together with the virtual page offset.

According to an embodiment of this invention, the lower-order segment of the virtual-memory page number is the primary index segment stored in secondary cache. As the virtual page offset is readily available for combining with the primary index segment, a primary-cache index may be derived from the primary index segment. Such virtual page offset is readily available because of the practice of mapping virtual memory and physical memory page by page. This practice causes virtual page offsets to be the same as the corresponding physical page offsets. Thus, the identical physical page offset, which is available as part of the translated physical address, is used to combine with the primary index segment. Accordingly, a primary-cache index may be formed to trace back from a secondary-cache block to potentially corresponding primary-cache blocks. As a result, appropriate primary-cache blocks are invalidated when found to be a subset of a secondary-cache block to be changed.

DESCRIPTION OF THE PREFERRED EMBODIMENT

Cache System Overview

Figure 3:
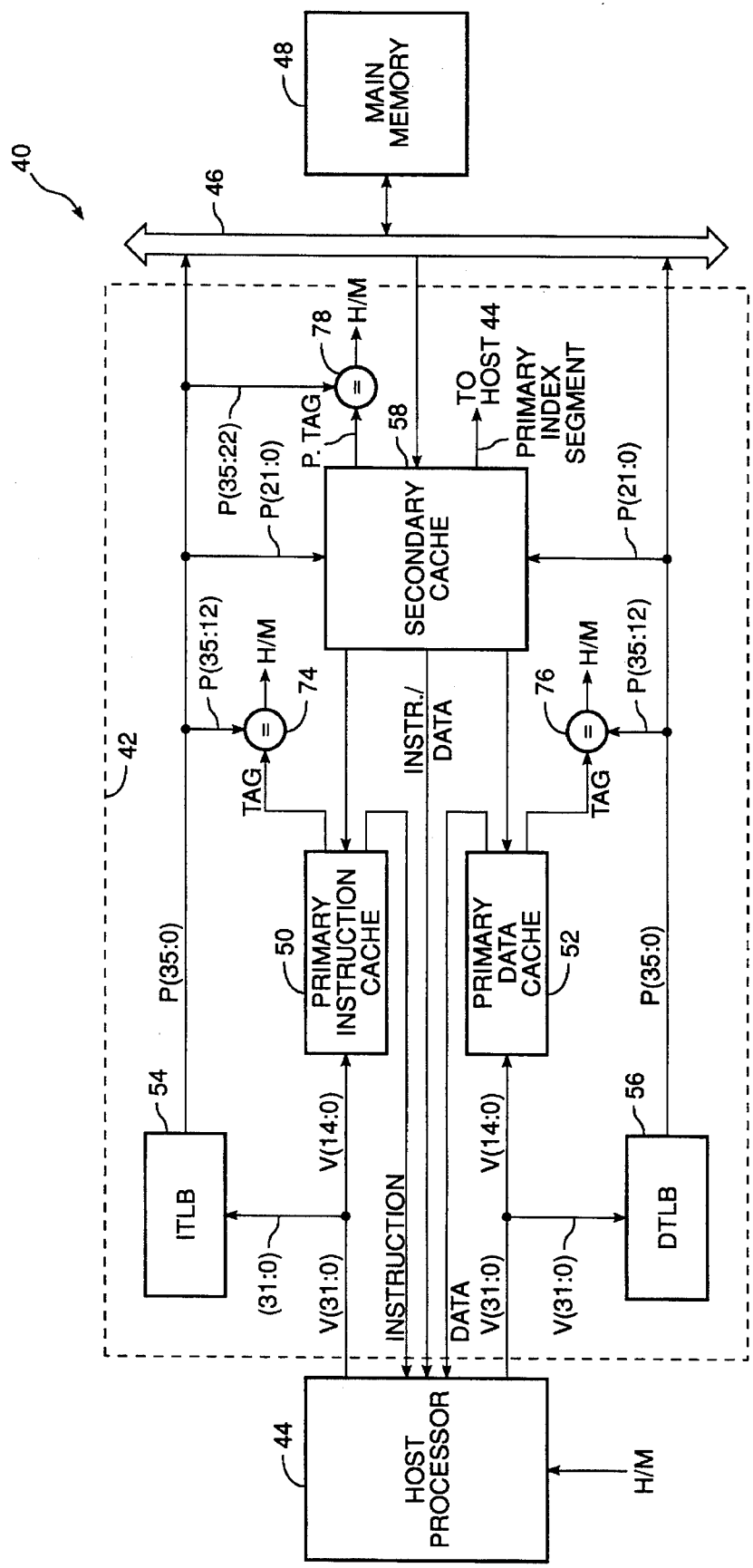
FIG. 3 is a block diagram of a hybrid cache memory system according to an embodiment of this invention.

FIG. 3 shows a host computer environment 40, including a cache memory system 42, a host processor 44, a bus 46 and main memory 48. The cache memory system 42, according to an embodiment of this invention, includes a primary instruction cache 50, a primary data cache 52, an instruction translation look-aside buffer (ITLB) 54, a data translation look-aside buffer (DTLB) 56 and a secondary cache 58. The function of the cache system 42 is to provide to the host processor 44 an instruction or data word corresponding to a specified virtual address. Accordingly, the host processor may act upon such instruction or data word. As described above, it is desireable to optimize the access time for retrieving an instruction or data word so as to maximize host computer system 40 throughput. An overview of the access process is described below.

To retrieve an instruction, primary instruction cache 50 is accessed to determine whether the instruction is present. If present, there is a cache hit and the instruction is input to the processor 44. If not present, then there is a cache miss and secondary cache 58 is accessed. If present in secondary cache for the corresponding virtual address, then there is a cache hit and the instruction is input to the processor 44 (and also loaded into the primary instruction cache 50). If not present, then there is a cache miss and main memory 48 is accessed through bus 46. Secondary cache 58 and primary instruction cache 50, thereafter, are loaded with the instruction from main memory 48. An identical procedure is implemented for accessing a data word, although the primary data cache 52 is accessed rather than the primary instruction cache 50.

Preferably, the secondary cache 58 is configurable as split equally between instructions and data or shared jointly between instructions and data.

Figure 1:
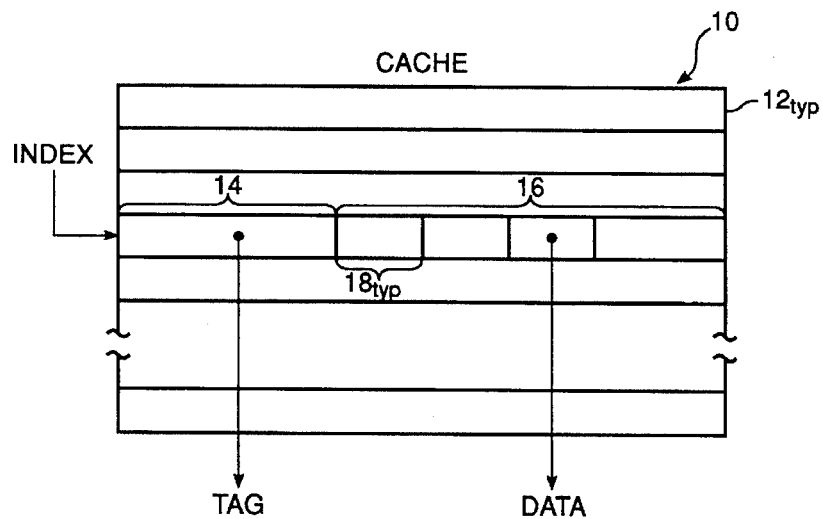
FIG. 1 is a block diagram of a conventional cache memory format.
Figure 2:
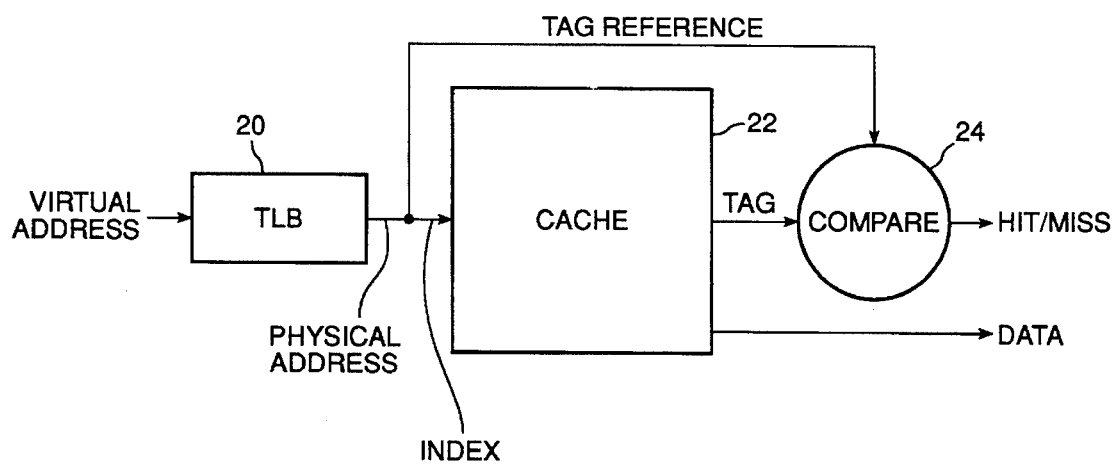
FIG. 2 is a block diagram depicting a conventional method for accessing a physical cache.

Primary caches 50, 52 conform to a conventional format 10 as shown in FIG. 1. Accordingly, the primary caches 50, 52 each include several lines 12. Each line 12 includes a tag 14 and a block 16 of words 18. The number of lines 12 and size of the block 16 vary according to the embodiment. Contrary to conventional caches which are purely physical cache or purely virtual cache, as described in the background section, the primary caches 50, 52, each are a combination of physical-cache and virtual-cache characteristics. The physical-cache characteristic is the use of a physical-address based tag. The virtual-cache characteristic is the use of a virtual-address based index. Accordingly, primary caches 50, 52 are accessed using a portion of the virtual address to index into the primary cache 50,52. Thereafter, the tag stored in the cache 50, 52 for such index is compared to a portion of the physical address corresponding to the virtual address. Such stored tag is derived from the physical address to which the tag corresponds.

Secondary cache 58 has different physical-cache/virtual-cache characteristics than primary caches 50, 52. Secondary cache 58 uses a physical-address based index and a physical-address based tag ("physical tag"). Secondary cache 58 also includes a primary index segment. The primary index segment is the upper portion of the corresponding primary-cache index.

Figure 4:
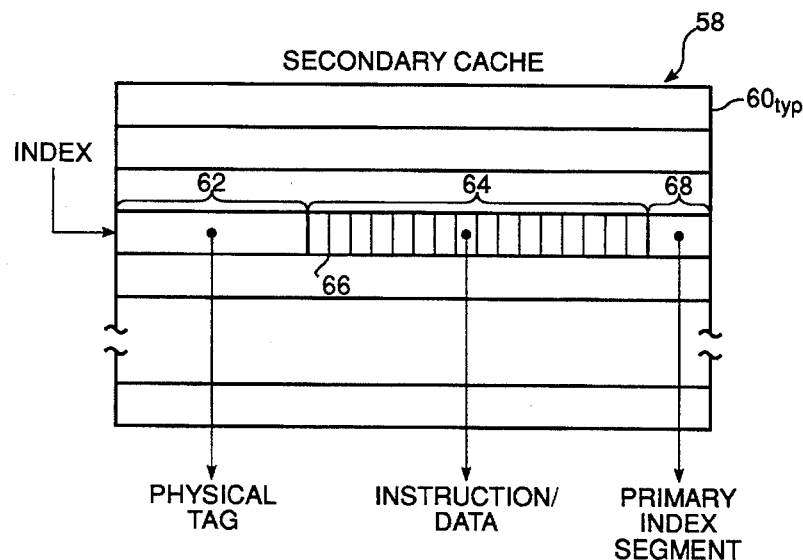
FIG. 4 is a block diagram of a secondary cache memory format according to an embodiment of this invention.

FIG. 4 shows the format for secondary cache 58 according to an embodiment of this invention. Secondary cache 58 includes several lines 60. Each line 60 includes a physical tag 62, a block 64 of instructions/data words 66 and a primary index segment 68. The number of lines 60 and size of the block 64 vary according to the embodiment. According to an embodiment of the system 40, a physical index is used to access secondary cache 58, whereas a physical tag is used to check the contents.

Interpretation of Physical Addresses and Virtual Addresses

A physical address addresses an actual, physical location in main memory 48, while a virtual address addresses a virtual location in virtual memory. The virtual address is mapped to a physical address and thus correlates to an actual physical location. Such correlated physical location varies according to the mapping function between virtual and physical addresses. Conventional operating systems assign a given process a section of virtual address space. For multiple processes, differing virtual address spaces may map to the same physical address space. Accordingly, it is common for multiple virtual addresses to correspond to the same physical address location.

Virtual address space and physical address space typically are organized into respective virtual-memory pages and physical-memory pages. Accordingly, a given virtual address is formed from a virtual-memory page number and an offset within the virtual-memory page. Similarly, a given physical address is formed from a physical-memory page number and an offset within the physical-memory page. Conventional operating systems map virtual addresses to physical addresses in page units. As a result, the page offset is the same for the virtual address and the corresponding physical address.

Figure 5:
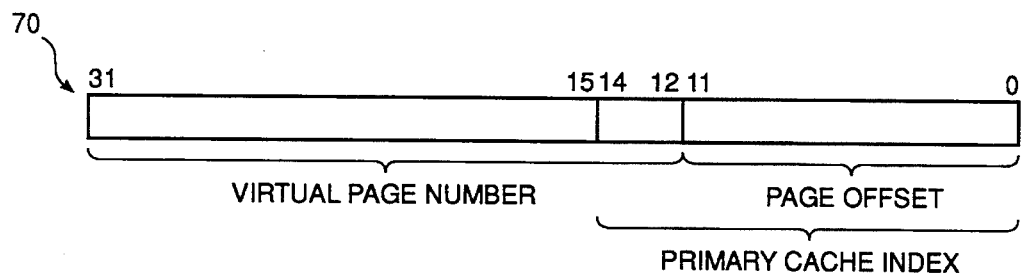
FIG. 5 is a chart of a virtual address format and a physical address format.
Figure 5:
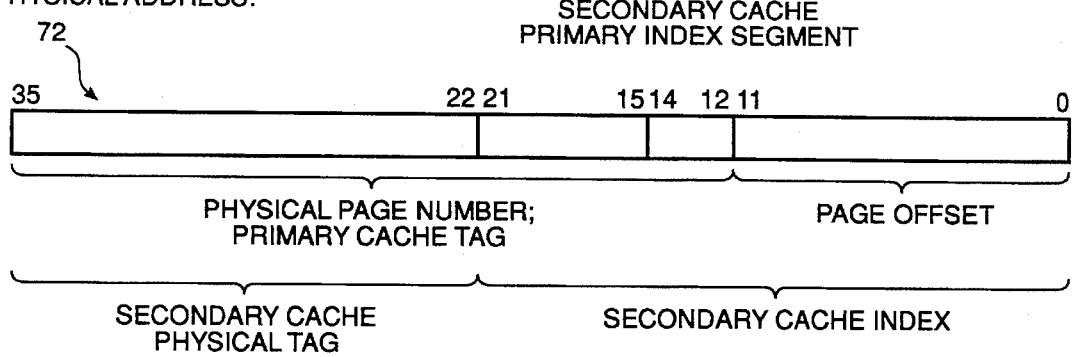

FIG. 5 shows an exemplary 32-bit virtual address 70 and an exemplary 36-bit physical address 72. As shown, bits 0–11 for each of virtual address 70 and physical address 72 form the respective page offset. As discussed above, such respective page offsets have the identical bit pattern. The virtual-memory page number is shown to include bits 12–31 of virtual address 70. The physical-memory page number is shown to include bits 12–35 of physical address 72.

As described above, the primary caches 50, 52 derive their respective indices from a virtual address, while deriving their respective tags from a physical address. For the exemplary 32-bit virtual address 70 and 36-bit address 72 of FIG. 5, exemplary allocation of the bit patterns to the respective indices and respective tags are shown. The precise allocations vary according to the embodiment, as may the bit lengths. Similarly, different embodiments for a host computer system may have virtual address lengths and physical address lengths different than the respective 32-bit and 36-bit embodiments shown and described.

According to the embodiment of FIG. 5, the primary-cache index is formed from bits 0–14 of the virtual address 70. For a 4-word primary-cache block 16, bits 4–14 index to the appropriate primary-cache line 12, while bits 2–3 select the appropriate word 18 in the primary-cache block 16 at such primary-cache line 12. Thus, the primary-cache index is referred to as a virtual index. Bits 0–11 correspond to the virtual page offset, while bits 12–14 correspond to a segment of the virtual-memory page number. Such segment forms the primary index segment 68 stored in secondary cache 58. The primary-cache tags 14 are formed from bits 12–35 of the physical address 72. Thus, the primary-cache tags 14 are referred to as physical tags. The secondary-cache index is formed from bits 0–21 of the physical address 72, and therefore is referred to as a physical index. For a 16-word secondary-cache block 64, bits 6–21 index to the appropriate secondary-cache line 62, while bits 2–5 select the appropriate word 66 in the secondary-cache block 64 at such secondary-cache line 62. The secondary-cache tag 62 is formed from bits 22–35 of the physical address 72, and therefore, is referred to as a physical tag.

FIG. 3 shows the parses of virtual address and physical address bit patterns for the respective indices and tags according to the exemplary virtual and physical address embodiments of FIG. 5.

Host Processor Access to Primary and Secondary Cache

Figure 6:
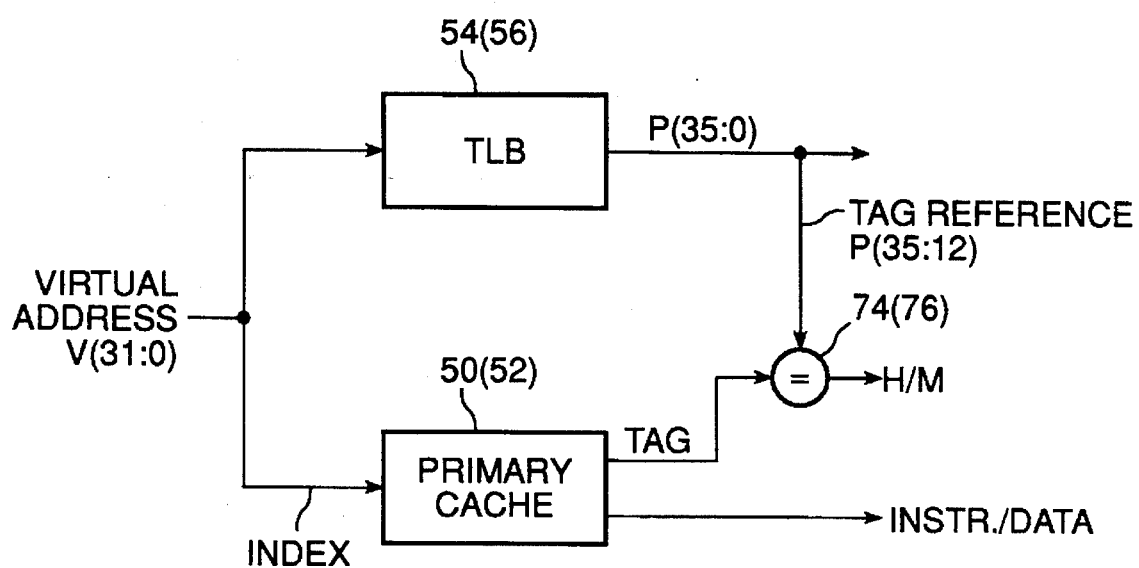
FIG. 6 is a block diagram of a primary cache in parallel with a TLB according to an embodiment of this invention.
Figure 7:
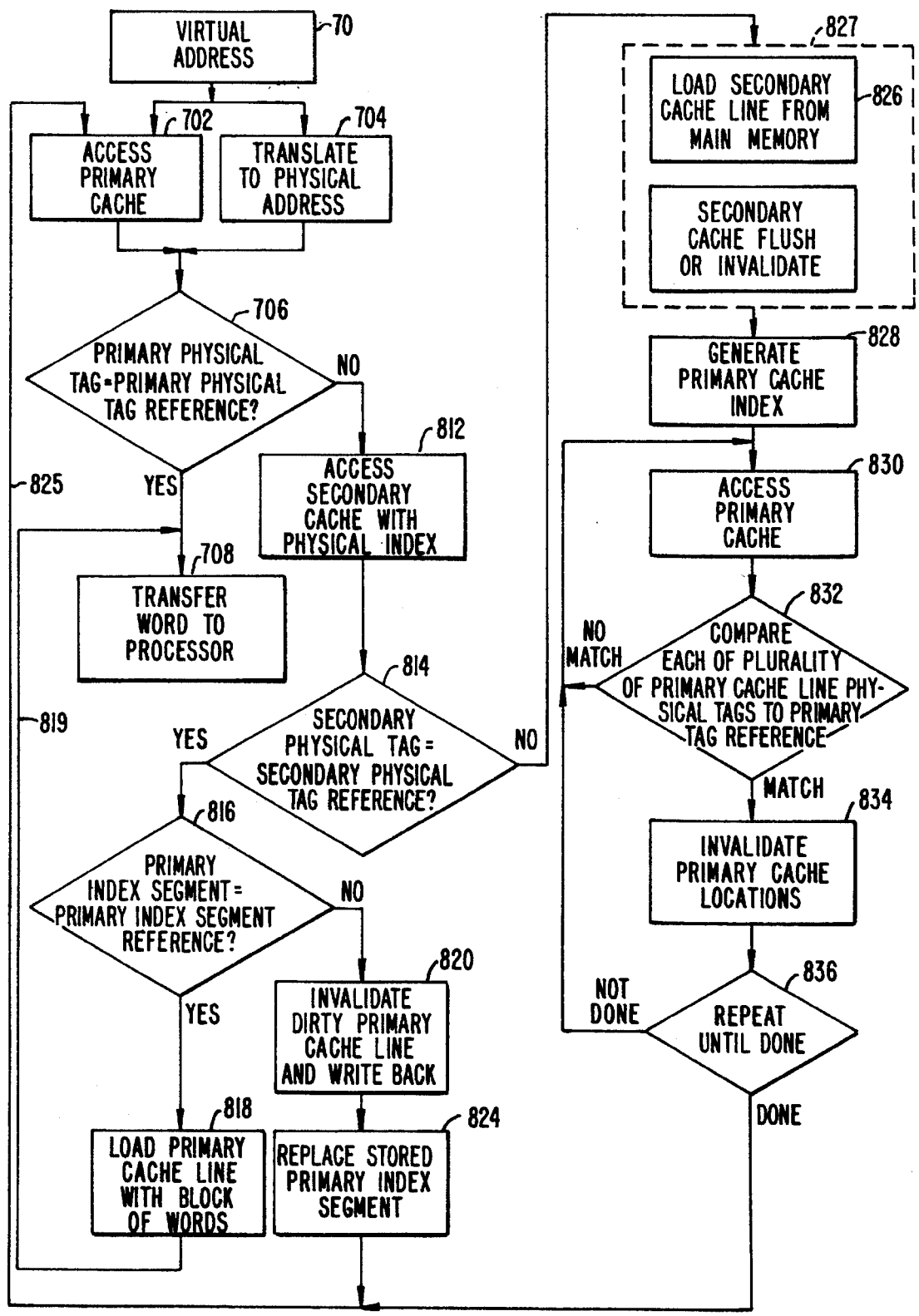
FIG. 7 is a flow chart depicting a method for accessing a cache memory system, according to the embodiment of the invention.

FIG. 7 depicts a method for accessing memory 42, 48 according to an embodiment of this invention. As shown, the host processor 44 first accesses, in step 702 primary cache 50(52) at the line 12 and word 18 (see FIG. 1) defined by the virtual index V(14:0). The block diagram of FIG. 6 isolates the access to primary cache 50(52), showing that generally coinciding with the indexing into cache 50(52), the virtual address V(31:0) is translated, in step 704 into a physical address P(35:0) by translation look-aside buffer 54(56). The primary-cache tag portion P(35:12) of the translated physical address then is compared, in step 706 to the stored tag 14 at the indexed line 12 by comparison logic 74(76). Such comparison logic may include a comparator, logic gates, or even a processor. The result of the comparison is either a hit H, or a miss M. If the result is a hit H, then the desired word is present in primary cache 50(52) and such word is input, in step 708 to the processor 44.

If the result is a miss M, then the desired word is not present in primary cache 50(52). As a result, secondary cache 58 is accessed, in step 812 using a physical index P(21:0) derived from the translated physical address P(35:0). The secondary cache tag portion P(35:22) of the translated physical address P(35:0) then is compared, in step 814 to the stored physical tag 62 at the indexed line 60 by comparison logic 78. Such comparison logic 78 may include a comparator, logic gates, or even a processor.

The result of the secondary-cache physical tag check is either a hit H, or a miss M. If the result is a hit H, then the desired word is present in secondary cache 58, although it may not be for the same virtual address as requested. To determine whether the stored item is for the same virtual address as requested, the primary index segment 68 is compared, in step 816 to the corresponding portion V(14:12) of the virtual address.

If the primary-index-segment check results in a match, then the word in secondary cache is for the same virtual address as the host processor 44 specified. Accordingly, the indexed word is input, in step 819 to the host processor 44. In addition, the word including adjacent words forming a primary-cache block are loaded, in step 818 into primary cache 50(52).

If the primary-index-segment check fails (e.g., no match), then an exception occurs. During the exception the primary cache line, if dirty, is invalidated and written back, in step 820. In addition, the stored primary index segment 68 is replaced, in step 824 with the primary index portion V(14:12) of the virtual address V(31:0). Thereafter, another access is generated, in step 825 during which a primary-cache miss and secondary-cache hit occur for the desired virtual address. A primary-cache block then is loaded from the accessed secondary-cache block. According to another embodiment, the failed result of the primary-index-segment check may be handled like a secondary-cache physical tag check miss. A physical tag check miss M causes main memory 48 to be accessed so as to load, in step 826 the desired word (and the adjacent words forming a secondary-cache block 64) into secondary cache 58.

Maintaining Cache Coherency

To maintain a coherent cache memory system 42, primary cache 50(52) at any given time is allowed to have only one word 18 which corresponds to a unique physical address 72. Such rule is referred to herein as a "one word at a time" rule. Accordingly, the problem resulting from using a virtual index as described in the background section, is avoided. As a result, managing the cache system 42 to maintain cache coherency is simplified.

To enforce such "one word at a time" rule, a primary index segment 68 is included in each secondary-cache line 60. Given a first virtual address and second virtual address corresponding to the same physical location, the host processor 44 will first come across the first virtual address. As a result, the secondary cache 58 is loaded with the secondary-cache block 64, secondary-cache physical tag 62 and primary index segment 68 for such first address. In addition primary cache 50(52) is loaded with the primary-cache block 16 and primary-cache physical tag 14 for such first address. Thereafter, when the host processor 44 accesses the second virtual address, the virtual index results in a primary-cache miss and a secondary-cache hit. When the primary index segment 68 is checked, however, it is determined that the stored secondary-cache block 64 corresponds to the first virtual address, in step 828. To enforce the "one word at a time" rule, the primary index segment 68 is changed to correspond to the second virtual address. In addition, the primary-cache block 16 for the first virtual address is invalidated, in step 834. Accordingly, primary cache 50(52) at any given time includes no more than one word which corresponds to a single physical address.

To enable invalidation of the appropriate primary-cache block and to further maintain a coherent cache memory system 42, primary caches 50, 52 are maintained as a subset of secondary cache 58. To so maintain primary cache, primary cache 50(52) is loaded from secondary cache 58 and is inspected whenever a secondary-cache block 64 is changed by any one of being invalidated, flushed or overwritten, in step 827. Any primary-cache blocks 16 corresponding to the Changed secondary-cache block 64 are invalidated.

To optimize the inspection of primary cache 50(52), only the lines 12 in primary cache 50(52) which might potentially include a primary-cache block 16 corresponding to a part of the changed secondary-cache block 64 are inspected, in step 830. For the exemplary, 16-word secondary-cache block and 4-word primary-cache block, there are 4 potential primary-cache blocks which could be part of a changed secondary-cache block. Accordingly, four primary-cache lines 12 are inspected.

To index to such four primary-cache lines 12, the primary index segment 68 is combined with the page offset portion of the translated physical address, in step 828. As previously discussed, such page offset portion is the same for both the physical address and virtual address and is part of a primary-cache index as shown in FIG. 5. Alternatively, the primary index segment 68 could be combined with the page offset portion of the virtual address for the new secondary-cache block, as it too will be the same. It is because such page offsets are the same that the two virtual addresses (whether or not corresponding to the same physical address) map to the same secondary-cache line 60. Similarly, the primary index segment could be combined with the page offset portion of the secondary-cache index as it is derived from the translated physical address. In each case, the identical primary-cache index is formed for accessing the lines 12 of primary cache 50(52) which potentially may have a primary-cache block which is a portion of the changed secondary-cache block.

To inspect each one, in step 836 of the indexed primary-cache lines 12, the primary-cache physical tag 14 at such line 12 is compared, in step 832 to the primary address reference P(35:12) previously derived for the initial primary-cache miss, which led to the secondary-cache access and change. For each accessed line 12 in which a match occurs, the primary-cache block 16 for such line 12 corresponds to a portion of the changed secondary-cache block 64. Such primary-cache line 12 (and thus primary-cache block 16), if dirty, also is written back. Each primary-cache line 12 includes state bits defining invalid and valid states (not shown) for signifying the current status of such primary-cache line. Accordingly, each valid primary-cache block is a subset of secondary-cache block.

Conclusion

Although a preferred embodiment of the invention has been illustrated and described, various alternatives, modifications and equivalents may be used. For example, although the cache system 42 has been described for a 32-bit virtual address 70 and 36-bit physical address 72, the bit sizes may vary. Further, the number of bits forming the primary-cache index, primary-cache tags and primary index segment may vary, along with the number of bits forming the secondary-cache index and secondary-cache tag. Further, although a four word primary-cache block size and sixteen word secondary-cache block size have been used as exemplary sizes for the description, other block sizes may be used.

Primary cache and secondary cache have been described as having valid and invalid states. Such states may simply be a single valid state and a single invalid state. According to various embodiments, however, the valid states may include shared, dirty-shared, clean-exclusive and/or dirty-exclusive states.

Although the invention has been described for a memory system including two cache levels, the invention also applies to memory systems having more than two cache levels. Further, the invention may be applied to other caches, such as n-way associative caches, write-through caches and joint instruction and data caches.

Therefore, the foregoing description should not be taken as limiting the scope of the invention which is defined by the appended claims.

What is claimed is:

1. A method, in a computing device having a processor, a main memory and a cache memory system having a primary cache and a secondary cache, said method for accessing said primary cache using an n-bit virtual address having a virtual page number and a page offset, comprising the steps of:

accessing an indexed primary-cache line using a virtual index, said primary cache line storing at least a first word, said virtual index being a first subset of the n bits forming said virtual address, said indexed primary-cache line storing a primary-cache physical tag;

translating said n-bit virtual address into a translated address, including a translated m-bit physical address;

comparing said primary-cache physical tag with a primary tag reference, said primary tag reference being a first subset of the m-bits forming said translated m-bit physical address;

accessing a secondary-cache line with a physical index in response to a mismatch between said primary-cache physical tag and said primary tag reference, said physical index being a second subset of the m bits forming said translated physical address, said secondary-cache line comprising a secondary-cache physical tag, a second word and a primary index segment;

checking said secondary-cache physical tag with a secondary tag reference to confirm a desired physical address is being accessed, said secondary tag reference being a third subset of the m-bits forming said translated physical address; and comparing said primary index segment to a primary index segment reference in response to a match between said secondary-cache physical tag and said secondary tag reference so to determine whether said second word is also addressed by said n-bit virtual address, said primary index segment reference being a second subset of the n bits forming said virtual address.

2. The method of claim 1, in which said secondary-cache line further comprises a secondary-cache block, and further comprising the step of loading said primary-cache line with a block of words in response to a match between said primary index segment and said primary index segment reference, said block of words being a subset of said secondary-cache block.

3. The method of claim 1, further comprising the steps of writing back said indexed primary-cache line to said secondary cache line and changing said primary index segment at said primary-cache line to equal said primary index segment reference in response to a mismatch between said primary index segment and said primary index segment reference.

4. The method of claim 1, in which said primary cache comprises a plurality of primary-cache lines, each one primary-cache line having a primary-cache block of j words and a primary-cache physical tag, and in which said secondary-cache comprises a plurality of secondary-cache lines, each one secondary-cache line having a secondary-cache block of k words and a secondary-cache physical tag and a primary index segment, and further comprising the step of invalidating each one primary-cache line which includes a primary-cache block which is a subset of a secondary-cache block identified for being any one of invalidated, flushed or overwritten.

5. The method of claim 1, further comprising the step of loading said secondary-cache line with a block of words from said main memory in response to a mismatch between said secondary-cache physical tag and said secondary tag reference.

6. The method of claim 5, further comprising the steps of:

generating a new virtual index from said primary index segment;

accessing primary cache at a plurality of primary-cache lines based upon the generated new virtual index, each one line of said plurality of primary-cache lines having a primary-cache physical tag;

for each said one line, comparing said primary-cache physical tag with said primary tag reference; and invalidating said one line in response to a match between said primary-cache physical tag and said primary tag reference.

7. The method of claim 5, further comprising the steps of:

generating a new virtual index from said primary index segment; and accessing a primary-cache line based upon said new virtual index.

8. The method of claim 7, wherein said step of generating a new virtual index comprises the step of:

combining said primary index segment with a physical page offset, said physical page offset being a fourth subset of the m bits forming said translated physical address.

9. The method of claim 7, wherein said step of generating a new virtual index comprises the step of:

combining said primary index segment with a virtual page offset, said virtual page offset being a third subset of the n bits forming said virtual address.

10. A cache memory system in a computing device having a processor, for responding to an n-bit virtual address having at least a virtual page number and a page offset, the system comprising:

a primary cache for storing words, said primary cache organized into a plurality of primary-cache lines, each primary-cache line for storing a primary-cache physical tag and a block of said words, wherein j words form a primary-cache block, each primary cache line being accessible in response to a virtual index, wherein said virtual index is a first subset of said n bit virtual address;

means for translating said n-bit virtual address to an m-bit physical address;

a secondary cache for storing words, said secondary cache organized into a plurality of secondary-cache lines, each secondary-cache line for storing a secondary-cache physical tag for identifying a physical address, a primary index segment for identifying a virtual address, and a block of said words, wherein k words form a secondary-cache block each secondary cache line being accessible in response to a physical index wherein said physical index is a first subset of said m-bit physical address;

means coupled to said primary cache for comparing a first select primary-cache physical tag stored in said primary cache with a primary-cache tag reference, wherein said primary-cache tag reference is a second subset of said m-bit physical address;

means coupled to said secondary cache for comparing a select secondary-cache physical tag stored in said secondary cache with a secondary-cache tag reference wherein said secondary-cache tag reference is a third subset of said m-bit physical address; and means for comparing a select primary index segment stored in said secondary cache and a primary index segment reference in response to a match between said select secondary-cache physical tag and said secondary-cache tag reference so to determine whether a word in said secondary cache is the word addressed by said n-bit virtual address wherein said primary index segment reference is a second subset of said n-bit virtual address.

11. The cache system of claim 10 in which each one primary-cache block is a subset of a secondary-cache block.

12. The cache system of claim 10, further comprising means for invalidating a primary-cache line which includes a select primary-cache block which is a subset of a secondary-cache block identified for being any one of invalidated, flushed or overwritten.

13. The cache system of claim 10, further comprising:

means for comparing said primary-cache tag reference to a second select primary-cache physical tag of a select primary-cache line accessed using a new virtual index wherein said new virtual index comprises said select primary index segment and a third subset of said n-bit virtual address; and means for invalidating said select primary-cache line accessed using said new virtual index in response to a match between said primary-cache physical tag and said primary-cache tag reference.

* * * * *